Patented Dec. 5, 1944

2,364,052

UNITED STATES PATENT OFFICE 2,364,052

VULCANIZATION OF RUBBER

Frederick C. Bersworth, Verona, N. J., and Morris Omansky, Brookline, Mass., assignors, by direct and mesne assignments, to The Martin Dennis Company, Newark, N. J., a corporation of New Jersey No Drawing. Application November 22, 1941,
Serial No. 420,100

7 Claims. (Cl. 260—793)

This invention relates to rubber compositions containing amines. In particular, it relates to compositions prepared from natural rubber either crude, vulcanized or reclaimed, an organic accelerator or accelerators of the carbon disulfide group, and one or more amines which may be aliphatic, aromatic, heterocyclic, or mixed—although, as hereinafter pointed out, it is not entirely limited to the preparation of rubber compositions wherein carbon disulfide type accelerators are used.

A particular object of this invention is the production of vulcanized rubber products which have a remarkably superior tensile strength and toughness over products made in the same way from the same ingredients but without the addition of amines as described herein. This superior tensile strength, which may be as high as 150% of that ordinarily obtainable without the use of amines as herein disclosed, is attained without sacrifice of the other properties; hardness, elasticity, and tear resistance, for example, are fully as good as, and in many instances better than, in products similarly made and composed but without amine.

Another object of this invention is to improve the plasticity and workability of the unvulcanized rubber masses during mixing and milling, while largely or wholly eliminating the need for using degrading plasticizers such as pine tar, asphalt, or oils. This feature is of most use in the handling of batches of rubber compositions intended for especially tough products; in accordance with this invention, such batches are of good plasticity during milling and yet on vulcanization give products of the desired high toughness.

Other objects will appear from the following disclosure.

These and other useful objects are attained by mixing together natural rubber, an organic accelerator, preferably of the carbon disulfide group, and an amount of an amine which, when a carbon disulfide type accelerator is used, is in excess of that required to combine with the acidic constituent or radical of the accelerator. Other usual compounding ingredients such as fillers, vulcanizing agents, coloring materials, and antioxidants may be added to the mix, and the usual compounding, mixing, forming and vulcanizing technique followed as desired.

The carbon disulfide group of accelerators is made up of those accelerators which are derivatives of carbon disulfide, $CS_2$. These include various thiurams, thiocarbamates, and thiazoles, for example "Altax" (benzothiazyl disulfide), "Captax" (mercaptobenzothiazole) and "Zimate" (zinc dimethyl dithiocarbamate). Each molecule of each of these compounds contains at least one sulfur group which is capable of reacting with an amino group to form a quaternary ammonium salt or other reaction product. Thus, in mercaptobenzothiazole, the —SH group so reacts, and in benzothiazyl disulfide both sulfur atoms of the S—S linkage so react. Hence substantially one mol of monoamine reacts with one mol of mercaptobenzothiazole, while two mols of a monoamine are required to react with one mol of benzothiazyl disulfide. When polyamines are used, the amount required to react with the accelerator is less in proportion to the number of amino groups—e. g. one-half mol of diamine or one-third mol of triamine is substantially equivalent to one mol of monoamine.

The mere use of amines with carbon disulfide type accelerators in making rubber compositions, with the amine present in an amount not more than sufficient to combine or react with the accelerator, is not a feature of the present invention. Compositions so prepared do not exhibit the remarkable improvement in tensile strength and toughness which is an outstanding feature of products made in accordance with this invention, wherein the amine is used in an amount definitely in excess of that required to combine or react with the accelerator. The amount of excess amine will vary according to the composition and the type of product desired. Excellent results are obtained with an excess of 50 to 500 per cent of amine (based on reactive molecular equivalents as explained above). However, improvement in strength and toughness is apparent when an even smaller excess of amine is used. Furthermore, much larger quantities of amines can be employed, as in the production of special types of products.

Most of the acidic accelerators in common use are of the carbon disulfide group. Any other acidic accelerators not of that group can be employed in the same way—namely by using an excess of amine over that necessary to neutralize the acidic constituents of the accelerator. Similar exemplification of the amount of amine required may be applied when the carbon disulfide type accelerators are used—i. e. the amount of amine required is in excess of that needed to neutralize the acidic constituents of the accelerator. Stated otherwise, and independent of theory, the amount of amine used is sufficient that the vulcanized product exhibits definitely improved toughness and tensile strength over a product lacking such sufficient amount of amine but otherwise identical.

Other accelerators than those of the acidic type may be used in carrying out this invention. However, with such non-acidic, non-carbon disulfide group accelerators the improvements in toughness and tensile strength of the final product is more moderate for the same proportion of amine.

Amines suitable for use in the present invention may be primary, secondary or tertiary, and may be aliphatic, aromatic, heterocyclic (e. g. piperizine) or mixed (e. g. benzyl amine). They include the alkylene polyamines, e. g. ethylene diamine, the polyethylene polyamines, and the polymethylene diamines. Also included are the rubber-amine products described in the copending application of Frederick C. Bersworth (one of the present applicants), Serial No. 420,101, filed November 22, 1941. These rubber-amines may be prepared as described in the said copending application—for example by heating together under appropriate conditions rubber and an amine to form a liquid product which is soluble in water, in acids, and in alkalies. As stated in said copending application, the rubber used in making such rubber-amine reaction products may be either natural rubber, either as crude rubber or modified—e. g. reclaimed, vulcanized or chlorinated—and in or made from any of the usual forms such as pale crepe, smoked sheets, or latex; or it may be a vulcanizable synthetic rubberlike polymer such as a chloroprene polymer, a butadiene polymer, or an organic polysulfide polymer. The amine is characterized by having per molecule at least one amino nitrogen atom, each such amino nitrogen atom being attached to no other atoms than carbon and hydrogen, each such carbon atom to which the amino nitrogen is attached being non-aromatic (i. e. not part of an aromatic ring) and also being attached to no other atoms than carbon and hydrogen. The rubber and amine are heated together until a water-miscible liquid product is produced, and the amount of amine used is in excess of that required to produce said liquid product.

In the procedure of this invention, the amines do not serve as accelerators, although they generally enhance the accelerating action of the accelerators present. Hence the customarily used secondary accelerators or activators such as diphenyl guanidine may be omitted from the mix, in most instances at least, when carrying out this invention. If such activators are used, vulcanization times and/or temperatures will ordinarily require reduction accordingly.

In carrying out the procedure of this invention, the rubber, accelerator, and amine, together with such other compounding ingredients as may be required, are mixed together by usual milling technique so that a homogeneous rubber mass is produced. This is sheeted out or otherwise formed or manipulated, and then vulcanized if desired, generally in accordance with the usual procedure for handling the particular type of rubber composition in question—e. g. as for making tires, soles, rubberized fabric, or other rubber products, as the case may be.

Various modifications are possible in carrying out this process, as will be explained more fully in connection with the following examples, which are to be considered as illustrative rather than limiting.

Example I

Soft sport sole stocks were made up, by conventional technique, from the following ingredients, parts being by weight—stock A being conventional for this type of product while stock B is made in accordance with the present invention.

|  | Stock A | Stock B |
|---|---|---|
| Smoked sheets | 100 | 100 |
| Zinc oxide | 5 | 5 |
| Stearic acid | 2 | 2 |
| Sulfur | 2.5 | 2.5 |
| "Altax" accelerator | 0.5 | 0.5 |
| Antioxidant | 1 | 1 |
| "Silene" filler (a form of calcium silicate) | 56 | 56 |
| Diphenyl guanidine | 1 | |
| Triethylene tetramine | | 1 |

Samples of each stock in the form of sheets about $\frac{1}{16}$ inch thick were vulcanized at various steam pressures for various times, and it was found that the best products were obtained, for each stock, at about 40 pounds steam for 10 minutes.

Tensile tests were run in the same manner for several samples of each stock, cut from sheets about $\frac{1}{16}$ inch thick, vulcanized 10 minutes at 40 pounds steam. Results of these tests, averaged for the samples of each stock, are tabulated below:

| Elongation, per cent | Tensile stress, pounds per square inch | |
|---|---|---|
|  | Stock A | Stock B |
| 50 | 71 | 97 |
| 100 | 179 | 194 |
| 150 | 303 | 323 |
| 200 | 482 | 500 |
| 250 | 624 | 727 |
| 300 | 858 | 1,001 |
| 350 | 1,159 | 1,387 |
| 400 | 1,551 | 1,806 |
| 450 | 1,945 | 2,273 |
| 500 | 2,554 | 2,774 |
| 550 | 2,980 | 3,194 |
| Tensile strength at break | 3,074 | 3,290 |
| Elongation at break per cent | 568 | 560 |

Vulcanized products from stock B, therefore, show superior strength as compared with those from stock A, which is a good grade of stock for this use. In addition, vulcanized products from stock B are fully as good as, if not better than, those from stock A in elasticity, tear resistance, appearance, and other required characteristics. The improved modulus at intermediate elongations is superior in stock B to that of stock A and contributes to the toughness of the final product.

Example II

Tire tread stocks were made up, by conventional technique, from the following ingredients, parts being by weight. Stock C is a conventional high-test tire tread stock; stocks D, E and F are made in accordance with the present invention.

|  | Stock C | Stock D | Stock E | Stock F |
|---|---|---|---|---|
| Smoked sheets | 100 | 100 | 100 | 100 |
| Carbon black | 45 | 45 | 45 | 40 |
| Zinc oxide | 5 | 5 | 5 | 5 |
| Stearic acid | 3 | 3 | 3 | 2 |
| Sulfur | 2.75 | 2.75 | 2.75 | 2.5 |
| "Altax" accelerator | 1 | 1 | 1 | 1 |
| Antioxidant | 1 | 1 | 1 | 1 |
| "Antox" | 1 | | | |
| Propylene polyamine | | 1 | | |
| Rubber polyamine | | | 1 | 1 |

"Antox" is an antioxidant which also has an activating effect upon the "Altax." Propylene polyamine is a dimerization product of 1, 2 propylene diamine formed with loss of NH₃, and presumably corresponding to the formula

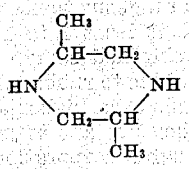

or dimethyl piperazine. The rubber polyamine is a yellow, viscous or jelly-like water-soluble reaction product of crude natural rubber and an alkylene polyamine made in accordance with the copending application hereinabove referred to.

Incorporation of the amines when carbon black is used in the stock may be in any desired manner during the milling, but as a general rule the mixing is best accomplished by adding the amine at the same time that the carbon black is added—except in the case of the more volatile amines, which are preferably added late in the mixing.

As in Example I, several tests were made on each stock to ascertain what were substantially the best vulcanizing conditions. These were essentially as follows, on 1/8 inch stock:

|  | Stock C | Stock D | Stock E | Stock F |
|---|---|---|---|---|
| Time_____minutes__ | 25 | 10 | 10 | 7½ |
| Pounds of steam_____ | 40 | 40 | 40 | 40 |

Tensile tests were run in the same manner for several samples of each stock, cut from sheets about 1/8 inch thick vulcanized under the preferred conditions for each as above set forth. Results of these tests, averaged for the samples of each stock, are tabulated below:

| Elongation, per cent | Tensile stress, pounds per square inch | | | |
|---|---|---|---|---|
|  | Stock C | Stock D | Stock E | Stock F |
| 50_____ | 167 | 199 | 215 | 164 |
| 100____ | 251 | 298 | 324 | 287 |
| 150____ | 390 | 447 | 467 | 430 |
| 200____ | 612 | 745 | 719 | 656 |
| 250____ | 891 | 1,075 | 1,094 | 985 |
| 300____ | 1,224 | 1,505 | 1,436 | 1,353 |
| 350____ | 1,584 | 1,966 | 1,939 | 1,845 |
| 400____ | 2,029 | 2,512 | 2,531 | 2,459 |
| 450____ | 2,474 | 3,042 | 3,067 | 3,015 |
| 500____ | 2,889 | 3,672 | 3,659 | 3,692 |
| 550____ | 3,447 | 4,319 | 4,253 | 4,265 |
| 600____ | 3,975 | 4,848 | 4,878 | 4,977 |
| Tensile strength at break_ | 4,500 | 5,126 | 5,363 | 5,336 |
| Elongation at break per cent__ | 645 | 620 | 648 | 630 |

The tensile tests on the samples of stock C show results above the average for usual tire tread stocks; as already pointed out, stock C is a high-test stock. Even so, the tensile tests on the samples of stocks D, E, and F show a remarkable improvement over those on stock C, giving results far above those obtainable with any tire tread stocks of which we are aware.

As to characteristics other than tensile strength and modulus, the four stocks in this example are substantially the same, any differences being minor and generally in favor of products made from stocks D, E, and F.

The advantages resulting from the application of this invention to the preparation of tire treads are of particular significance. They permit the manufacture of tires of remarkably increased mileage and wearing qualities, and thus aid materially in the conservation of rubber, which finds its principal use in tire manufacture.

As shown in the composition for stock F, this invention permits the use of somewhat less carbon black, thus allowing the production of a stock which should resist flexing better than conventional stocks, because of decreased loading of the rubber. Also, lower sulfur content is possible, without sacrifice of quality, and as a consequence the final products have better aging properties. Other forms of natural rubber than smoked sheets—e. g. pale crepe and reclaim—may be used, as in usual rubber technology, in the practice of this invention.

Another advantage of using amines in accordance with this invention is manifest in the preparation of very tough stocks such as those for tire treads, as just described. Since the amines have a plasticizing effect on the unvulcanized product, they make it possible to handle like normal compounds the batches for very tough products, thus permitting a combination of plasticity during milling with extremely tough vulcanized products—a combination hitherto practically unobtainable.

*Example III*

Tire tread stocks were made up, by conventional technique, from the following ingredients, parts being by weight.

|  | Stock G | Stock H | Stock J | Stock K |
|---|---|---|---|---|
| Smoked sheets_____ | 100 | 100 | 100 | 100 |
| Carbon black_____ | 45 | 45 | 45 | 45 |
| Zinc oxide_____ | 5 | 5 | 5 | 5 |
| Pine tar_____ | 1 | 1 | -- | -- |
| Stearic acid_____ | 2 | 2 | 2 | 2 |
| Antioxidant_____ | 1 | 1 | 1 | 1 |
| Sulfur_____ | 2.75 | 2.75 | 2.75 | 2.75 |
| "Altax" accelerator_____ | 1 | 1 | 1 | 1 |
| Benzyl amine_____ | 1 | -- | 2 | -- |
| Piperazine hexahydrate__ | -- | 1 | -- | 3 |

As in the previous examples, tests were made on each stock to ascertain what were substantially the best vulcanizing conditions. These were found to be, on 1/8" stock, about 10 minutes at 40 pounds for each of the foregoing stocks G to K inclusive.

Tensile tests were run as in the preceding examples; results are tabulated below:

| Elongation, per cent | Tensile stress, pounds per square inch | | | |
|---|---|---|---|---|
|  | Stock G | Stock H | Stock J | Stock K |
| 50_____ | 183 | 126 | 184 | 175 |
| 100____ | 272 | 221 | 286 | 288 |
| 150____ | 423 | 347 | 388 | 432 |
| 200____ | 605 | 473 | 659 | 633 |
| 250____ | 874 | 694 | 858 | 950 |
| 300____ | 1,243 | 1,008 | 1,204 | 1,294 |
| 350____ | 1,637 | 1,355 | 1,612 | 1,726 |
| 400____ | 2,030 | 1,679 | 2,060 | 2,215 |
| 450____ | 2,519 | 2,106 | 2,611 | 2,762 |
| 500____ | 3,033 | 2,676 | 3,203 | 3,337 |
| 550____ | 3,671 | 3,205 | 3,775 | 3,941 |
| 600____ | 4,133 | 3,717 | 4,428 | 4,602 |
| 650____ | 4,727 | 4,347 | 5,101 | -- |
| Tensile strength at break_ | 4,905 | 4,441 | 5,288 | 5,210 |
| Elongation at break percent__ | 665 | 665 | 663 | 660 |

The four stocks in this example are essentially the same as conventional stock C, except for the amines. Stocks G and H illustrate the use of amines in an amount only slightly in excess of that required to react with or neutralize the "Altax"; no significant increase in tensile strength and toughness is shown by the products of stock H, while products of stock G although definitely improved, are not as good as those of stocks D, E and F. In stock H, the amine functions primarily as an activator for the "Altax,"

although it also exerts a mild toughening action, as indicated by the stress-strain relationships.

On the other hand, stocks J and K show the remarkable strengthening and toughening resulting from use of sufficient excess of amine; vulcanized products made from these stocks are of the same order of strength and toughness as those made from stocks D, E and F.

In stocks G and H, pine tar is used to improve the plasticity of the mix during milling. Pine tar is unnecessary in stocks J and K since the amines are present in sufficient amount to impart the desired plasticity.

For making products such as those described in the foregoing examples, the amount of amine required is, as indicated, only a relatively small per cent on the weight of the rubber, and about the same as, or somewhat greater than, the amount of accelerator on a weight basis. When using non-acidic organic accelerators, the amount of amine should be greater than that required to activate acidic accelerators, in order that the improved toughness and strength can be attained in the final vulcanized product. This same criterion may in fact be applied to the determination of the amount of amine necessary whatever accelerator is used—including those accelerators of the carbon disulfide group—if the operator prefers such a criterion to those already given. Lack of conclusive knowledge of the reactions leading to, and the exact atomic structure of, vulcanized rubber compositions makes it generally impractical to set forth precisely the reactions of the amines and the accelerators in the procedure of this invention; the reactions and results already set forth herein are demonstrable facts whereas the theory underlying them is vague. It follows, therefore, that determination of the amount of amine must, in practice, be on the basis of physical characteristics during and after mixing and vulcanization.

When using polyamines such as those used in Examples I and II, for instance, we have obtained good results when using only ¼ part of such polyamines to one part "Altax" and 100 parts rubber (i. e. ¼ of the amounts of amines shown in Example II), and also when using two parts of such polyamines to one part "Altax" and 100 parts rubber. This represents a good working range with such compositions for most purposes. The amounts of other amines, e. g. monoamines, which are required can be determined in accordance with the preceding discussion. Larger or smaller amounts of amines, within the range required in this invention, may be used if desired, as in the preparation of special products, and when the ingredients of the stock are used in considerably different amounts from those given in the examples, and in preparing master batches, as described below.

The well-known master batch procedure may be followed in carrying out this invention. In so doing, a minor proportion of the rubber is mixed with the amine, together with more or less of the other compounding ingredients as desired, and the resulting master batch is then incorporated with the balance of the rubber and the other ingredients such as the fillers. This procedure is of course intended to secure greater homogeneity in the final mixture. In making the master batch, it is advantageous to use amine and rubber in the ratio of at least 1 to 10, by weight. In fact, we have obtained some of the best results with ratios of amine to rubber of 1 to 5 and 1 to 3, by weight. While even higher amounts of amine can be used, they are apt to present some difficulties in thorough incorporation of all the amine in the rubber. Master batches of amine and rubber in the ratio of 1 to 3 are rubbery masses which, although still solid, are soft and somewhat tacky, and have a slow cold flow.

These batches are in themselves new products, and may be used for purposes other than as master batches. This invention, in fact, includes generally rubber compositions containing both natural rubber and amines as herein defined, in which the rubber is present in an amount greater than that of the amine, by weight. And while the products of this invention are especially valuable in vulcanized condition, they may also be used in their unvulcanized condition.

We claim:

1. The process which comprises mixing together, to form a vulcanizable rubber product, natural rubber, an organic accelerator containing no free amino groups, and an amount of an alkylene polyamine which is between about 50% and about 500% in excess of that required to activate said accelerator, said accelerator being present in an amount which is in the order of that normally used with said rubber for preparing conventional vulcanized rubber products, said amine being present in an amount not more than about 3 parts per hundred parts of rubber, by weight.

2. The process of claim 1 in which the rubber is crude unvulcanized natural rubber.

3. The process of claim 1 in which the accelerator is a member of the carbon disulfide group of accelerators.

4. A vulcanized rubber product comprising before vulcanization natural rubber, an organic accelerator containing no free amino groups, and an alkylene polyamine, said amine being present in an amount between about 50% and about 500% in excess of that required to activate said accelerator but in an amount not greater than about 3 parts per hundred parts of rubber, by weight.

5. A vulcanized rubber product comprising before vulcanization natural rubber, an organic accelerator selected from the carbon disulfide group of accelerators, and an alkylene polyamine, said amine being present in an amount between about 50% and about 500% in excess of that required to neutralize said accelerator but in an amount not greater than about 3 parts per hundred parts of rubber, by weight.

6. A product in accordance with claim 4 in which the rubber is crude unvulcanized natural rubber.

7. A product in accordance with claim 5 in which the rubber is crude unvulcanized natural rubber.

FREDERICK C. BERSWORTH.
MORRIS OMANSKY.